USO11146369B2

(12) United States Patent
Park et al.

(10) Patent No.: US 11,146,369 B2
(45) Date of Patent: Oct. 12, 2021

(54) METHOD FOR REPORTING CHANNEL STATE INFORMATION IN WIRELESS COMMUNICATION SYSTEM AND APPARATUS THEREFOR

(71) Applicant: LG Electronics Inc., Seoul (KR)

(72) Inventors: Jonghyun Park, Seoul (KR); Kijun Kim, Seoul (KR); Jiwon Kang, Seoul (KR); Hyungtae Kim, Seoul (KR); Haewook Park, Seoul (KR); Kunil Yum, Seoul (KR)

(73) Assignee: LG Electronics Inc., Seoul (KR)

( * ) Notice: Subject to any disclaimer, the term of this patent is extended or adjusted under 35 U.S.C. 154(b) by 15 days.

(21) Appl. No.: 16/499,136

(22) PCT Filed: Mar. 26, 2018

(86) PCT No.: PCT/KR2018/003524
§ 371 (c)(1),
(2) Date: Sep. 27, 2019

(87) PCT Pub. No.: WO2018/182256
PCT Pub. Date: Oct. 4, 2018

(65) Prior Publication Data
US 2020/0044802 A1 Feb. 6, 2020

Related U.S. Application Data
(60) Provisional application No. 62/478,517, filed on Mar. 29, 2017.

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0626* (2013.01); *H04B 7/0632* (2013.01);
(Continued)

(58) Field of Classification Search
CPC ..... H04B 7/0626; H04L 1/0026; H04L 5/001; H04W 76/27; H04W 24/10
See application file for complete search history.

(56) References Cited

U.S. PATENT DOCUMENTS 9,634,751 B2 * 4/2017 Xia ................... H04B 7/0639
2015/0222347 A1 8/2015 Xia et al.
(Continued)

FOREIGN PATENT DOCUMENTS

| CN | 102377464 | 3/2012 |
| CN | 105991244 | 10/2016 |
| WO | WO2014059581 | 4/2014 |

OTHER PUBLICATIONS

EP extended European search report in European Appln. No. 18774498.2, dated Dec. 2, 2020, 12 pages.
(Continued)

*Primary Examiner* — Iqbal Zaidi
(74) *Attorney, Agent, or Firm* — Fish & Richardson P.C.

(57) ABSTRACT

A method for reporting channel state information by a terminal in a wireless communication system according to an embodiment of the present invention may comprise the steps of: receiving, from a base station, CSI-RS resource configuration information for receiving a first CSI-RS resource; receiving the first CSI-RS resource on the basis of the CSI resource configuration information; and reporting, to the base station, first CSI generated on the basis of the first CSI-RS resource, wherein, when the terminal receives configuration of one N-port CSI-RS resource according to the CSI resource configuration information, some ports of the
(Continued)

one Y-port CSI-RS resource are configured for channel measurement for the terminal, and the remaining ports except for the some ports of the one Y-port CSI-RS resource are configured for interference measurement for the terminal.

15 Claims, 9 Drawing Sheets

(51) Int. Cl.
    *H04B 7/0413*     (2017.01)
    *H04J 99/00*     (2009.01)

(52) U.S. Cl.
    CPC ......... *H04B 7/0634* (2013.01); *H04B 7/0413* (2013.01); *H04J 15/00* (2013.01)

(56) References Cited

U.S. PATENT DOCUMENTS

| | | |
|---|---|---|
| 2017/0012691 A1 | 1/2017 | Lee et al. |
| 2017/0373744 A1* | 12/2017 | Froberg Olsson ........................ H04W 72/1231 |
| 2018/0034613 A1* | 2/2018 | Liu ........................ H04L 5/0094 |

OTHER PUBLICATIONS

Ericsson, "CSI Framework," R1-1702679, 3GPP TSG-RAN WG1 #88, Athens, Greece, dated Feb. 13-17, 2017, 7 pages.
Huawei, HiSilicon, "Considerations on two-level configuration of CSI acquisition settings," R1-1701682, 3GPP TSG RAN WG1 Meeting #88, Athens, Greece, dated Feb. 13-17, 2017, 5 pages.
Catt, "Discussion on CSI-RS for CSI acquisition," R1-1702086, 3GPP TSG RAN WG1 Meeting #88, Athens, Greece, Feb. 13-17, 2017, 3 pages.
Ericsson, "On CSI-RS Pooling and Resource Allocation," R1-1700762, 3GPP TSG-RAN WG1 #87ah-NR, Spokane, WA, USA, Jan. 16-20, 2017, 6 pages.
Huawei, HiSilicon, "WF on CSI-RS Design," R1-1701327, 3GPP TSG RAN WG1 Meeting NR AH, Spokane, USA, Jan. 16-20, 2017, 5 pages.
Korean Office Action in Korean Appln. No. 10-2019-7027853, dated Sep. 25, 2020, 10 pages (with English translation).
NTT Docomo, "Discussion on CSI Framework," R1-1705721, 3GPP TSG RAN WG1 Meeting #88bis, Spokane, USA, Apr. 3-7, 2017, 6 pages.
NTT Docomo, "On CSI measurement for NR," R1-1705722, 3GPP TSG RAN WG1 Meeting #88bis, Spokane, USA, Apr. 3-7, 2017, 7 pages.
PCT International Search Report in International Appln. No. PCT/KR2018/003524, dated Jul. 16, 2018, 5 pages (with English translation).
Samsung, "Discussions on CSI-RS design for NR MIMO," R1-1702954, 3GPP TSG RAN WG1 #88, Athens, Greece, Feb. 13-17, 2017, 6 pages.
KR Notice of Allowance in Korean Appln. No. 10-2019-7027853, dated Mar. 16, 2021, 6 pages (with English translation).
NTT Docomo, "On CSI measurement for NR," R1-1702844, 3GPP TSG RAN WG1 Meeting #88, Athens, Greece, dated Feb. 13-17, 2017, 4 pages.
CN Office Action in Chinese Appln. No. 201880023000.X, dated Jul. 28, 2021, 16 pages (with English translation).

* cited by examiner

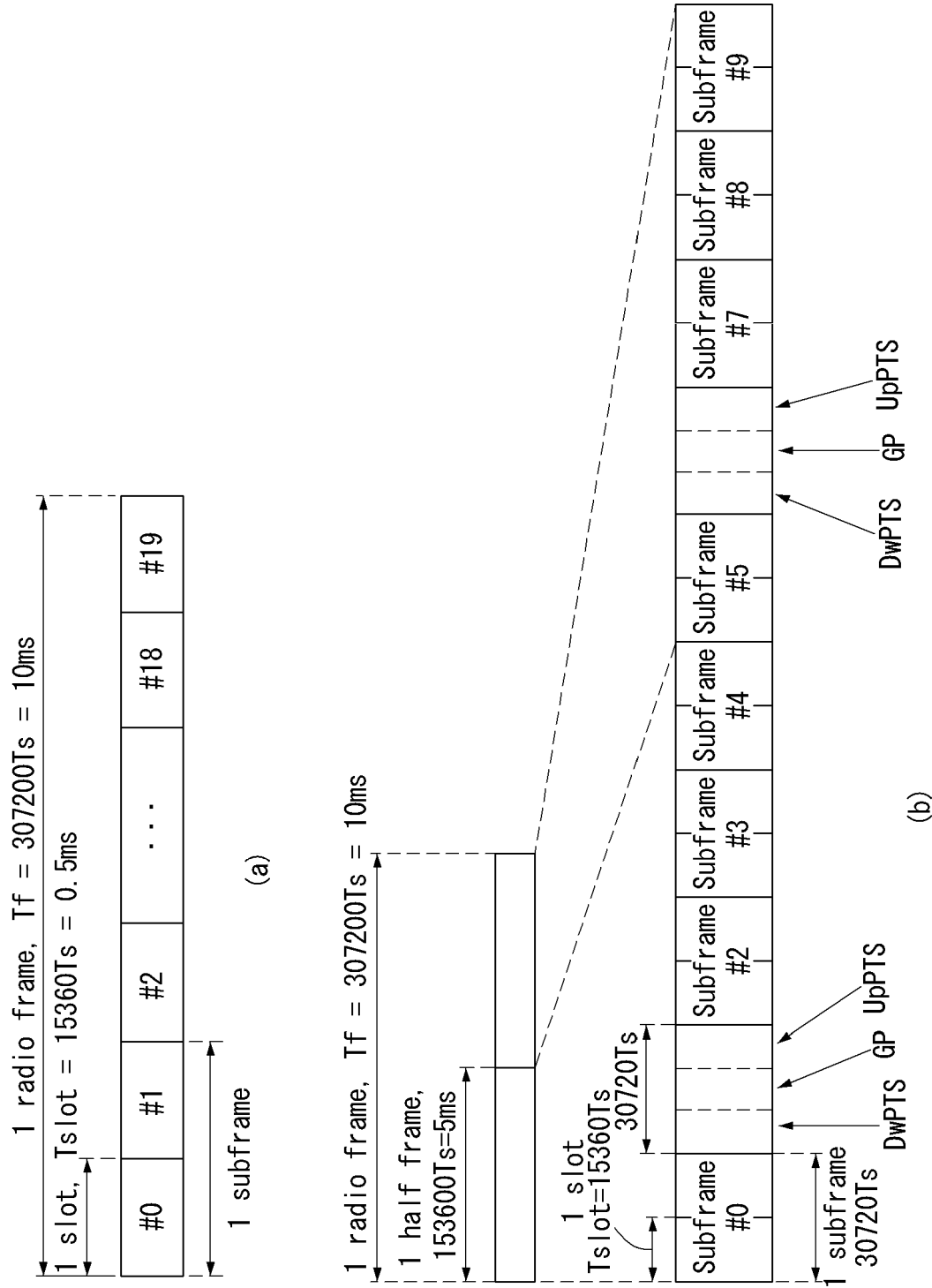
[Fig. 1]

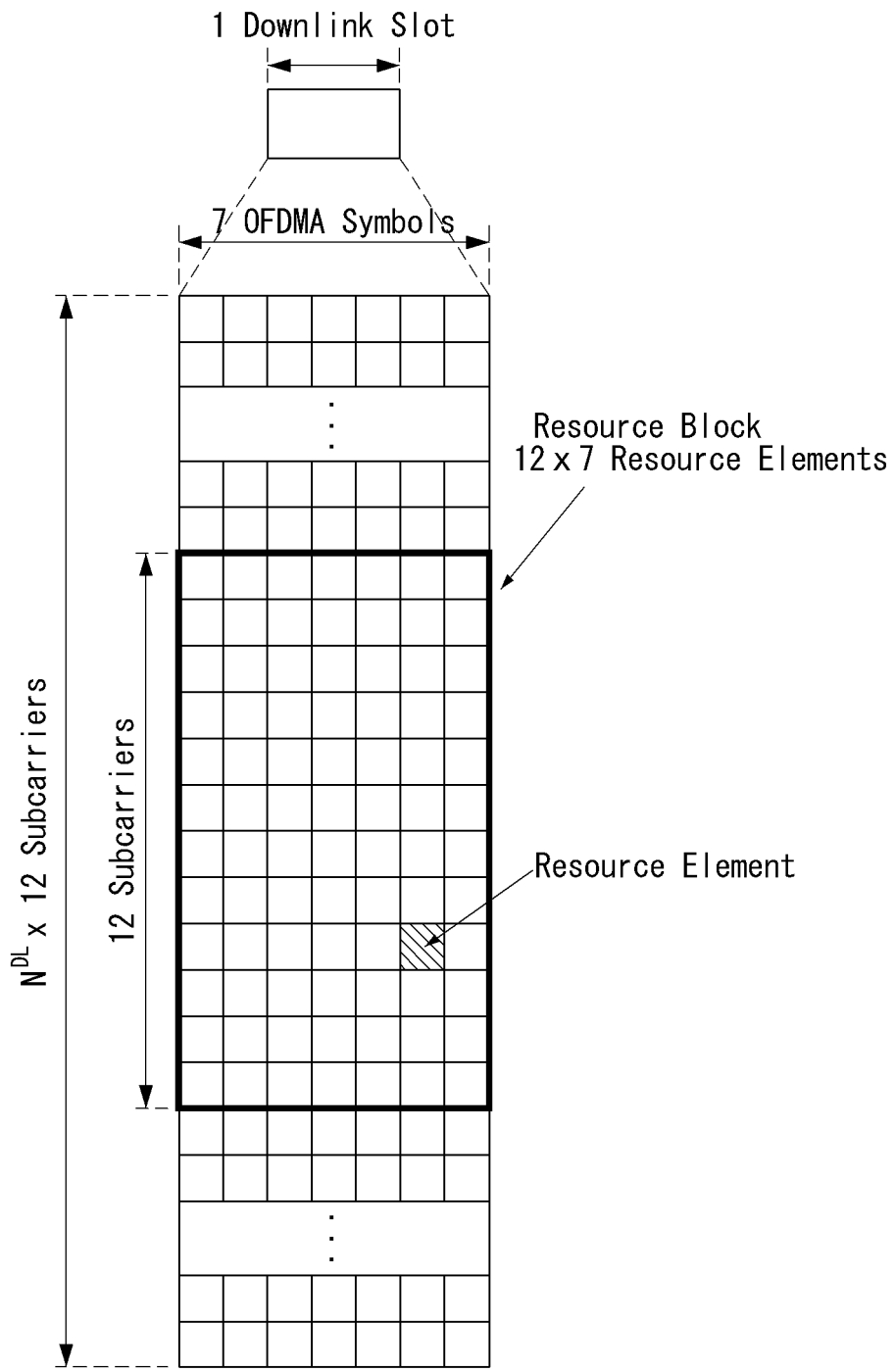
[Fig. 2]

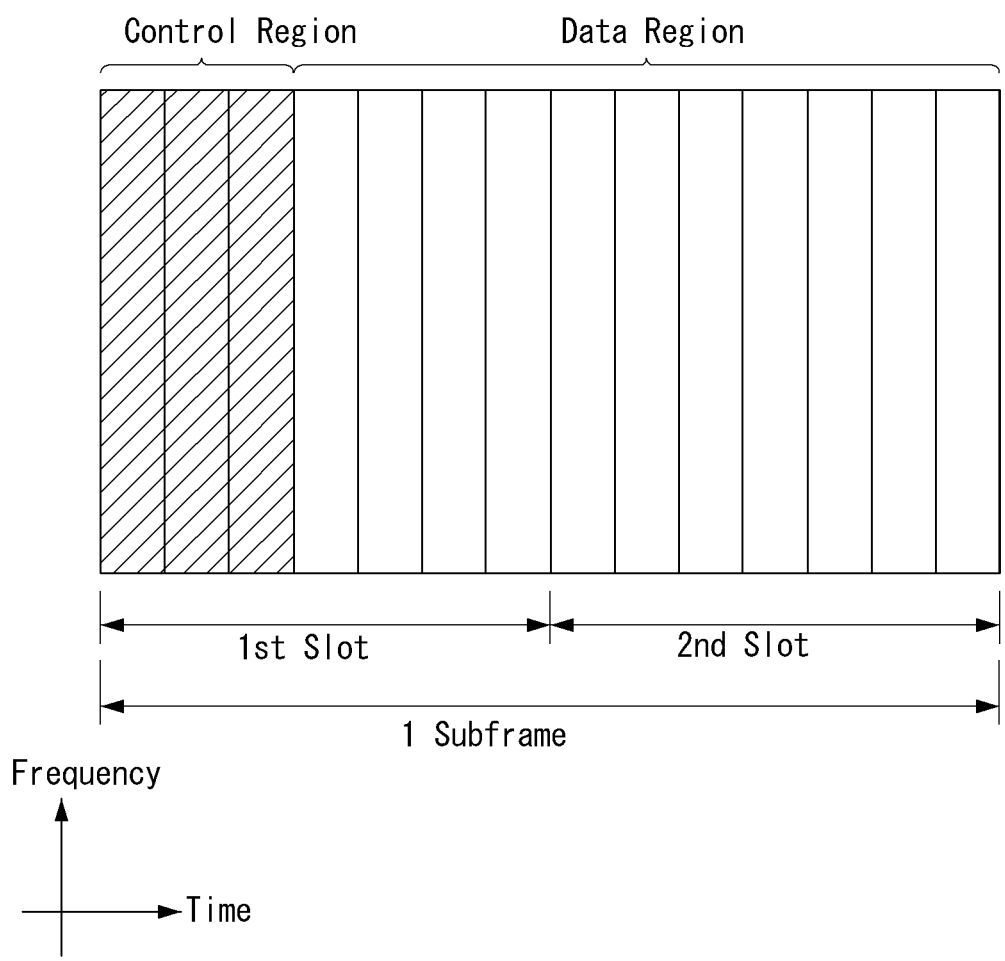

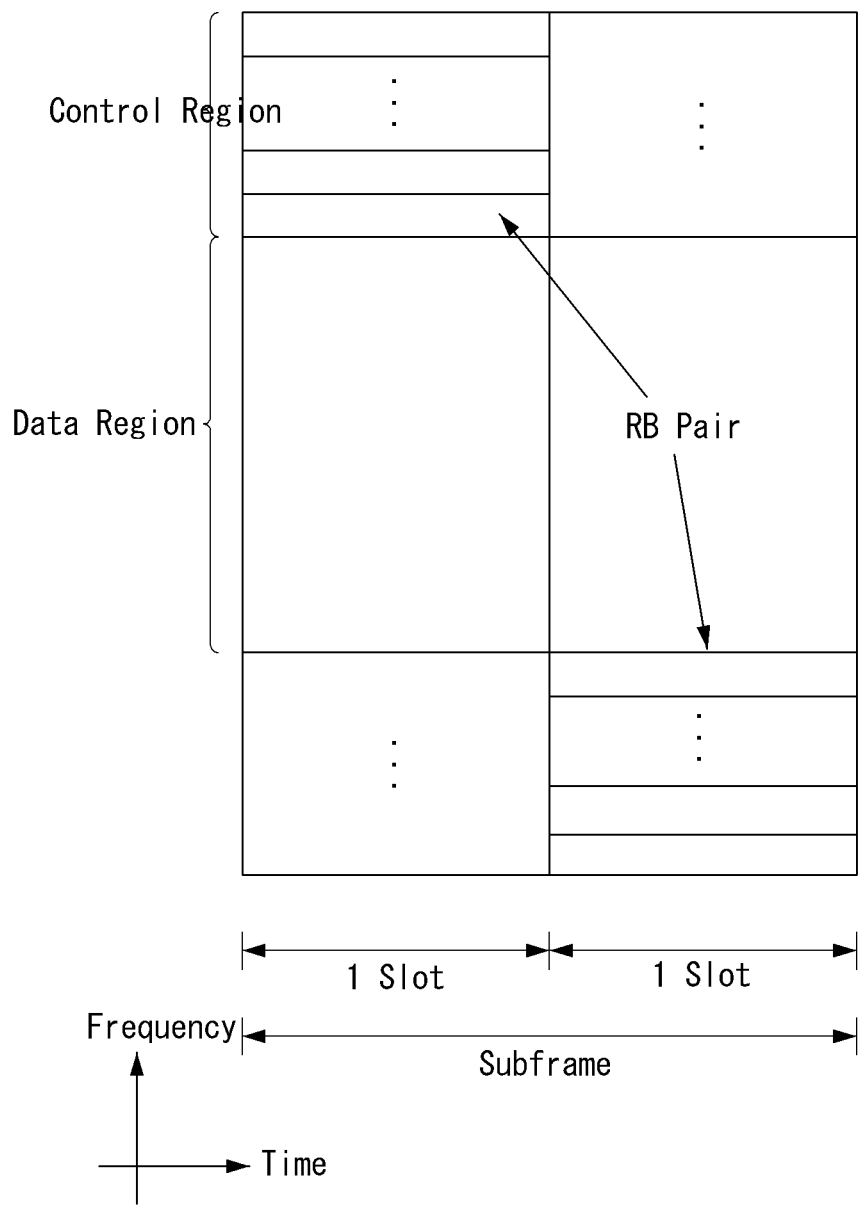

[Fig. 5]
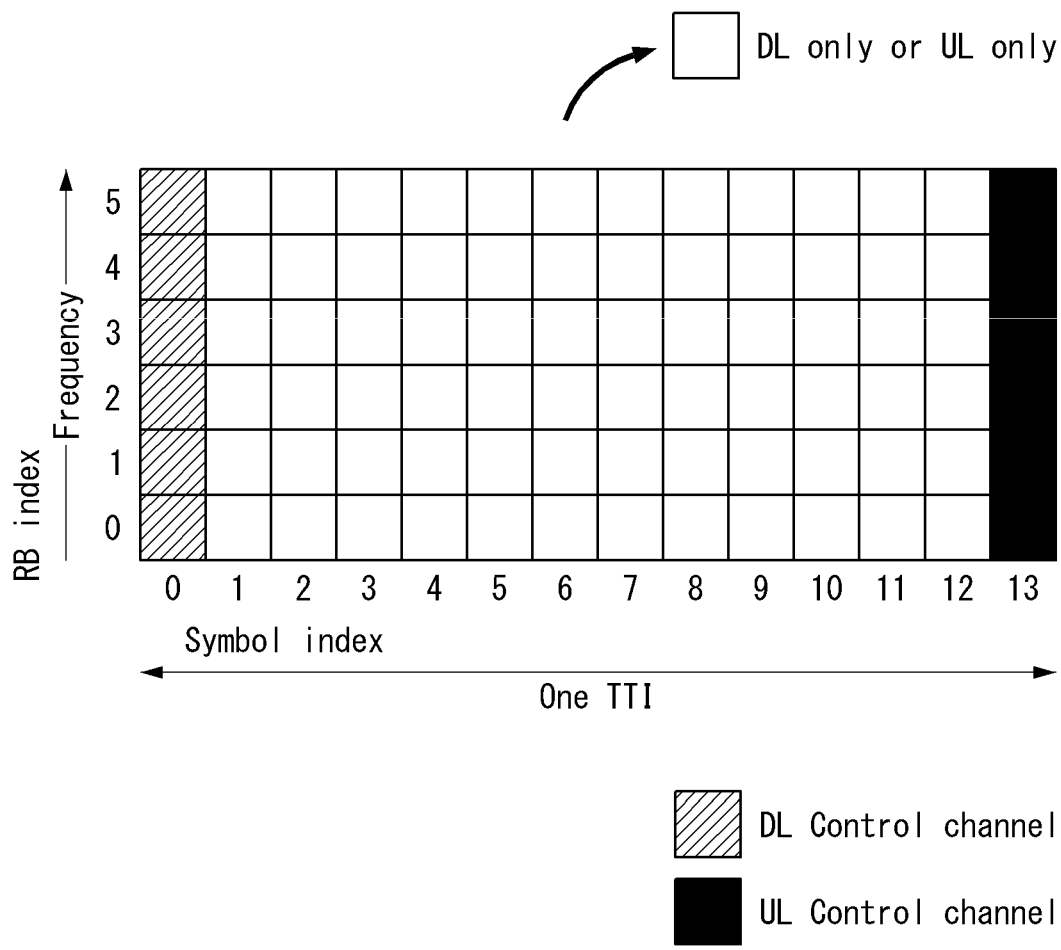

[Fig. 6]
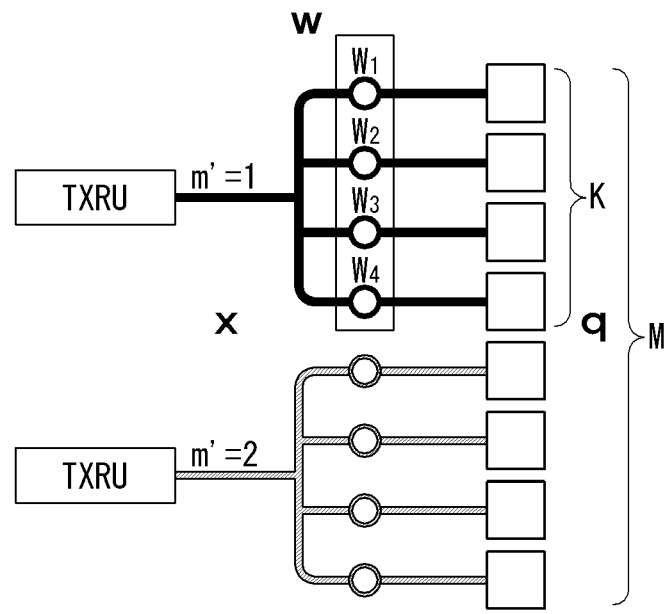
[Fig. 7]
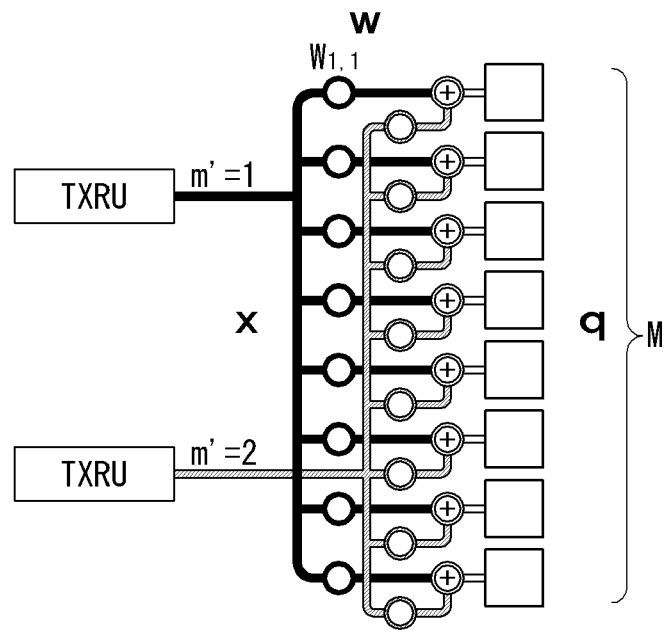

【Fig. 8】
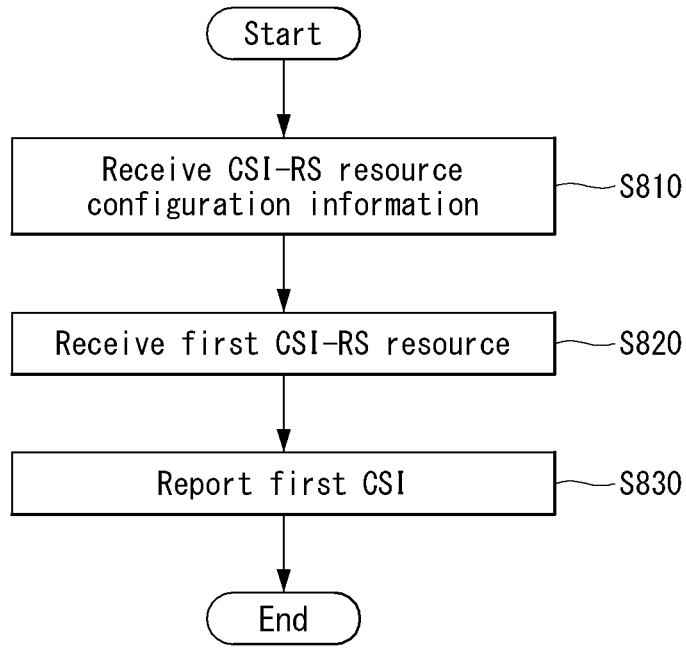
【Fig. 9】
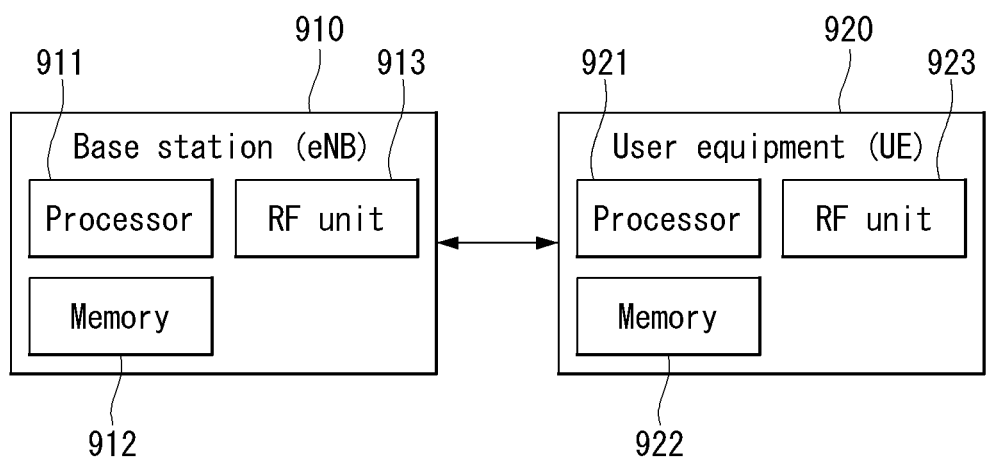

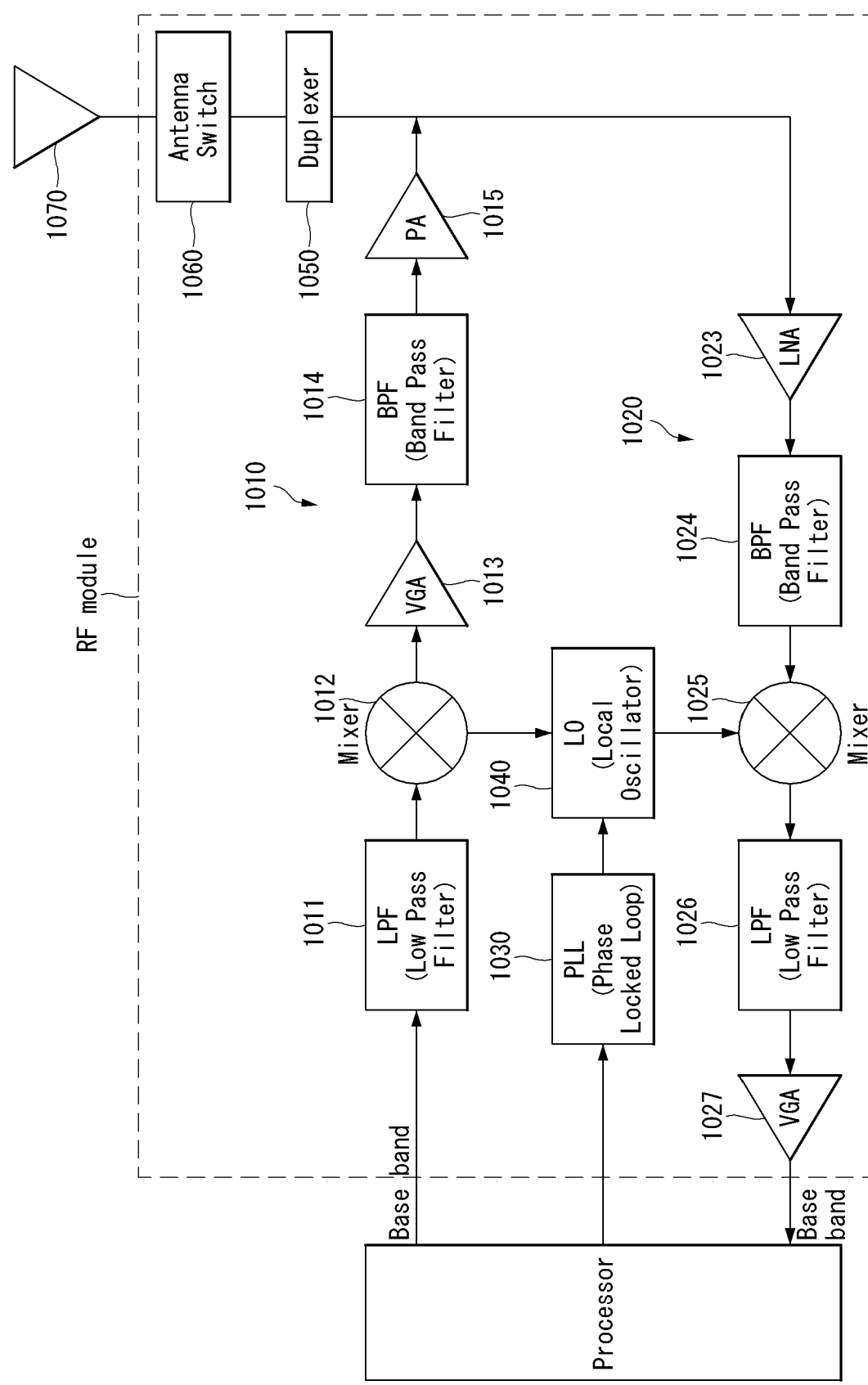
[Fig. 10]

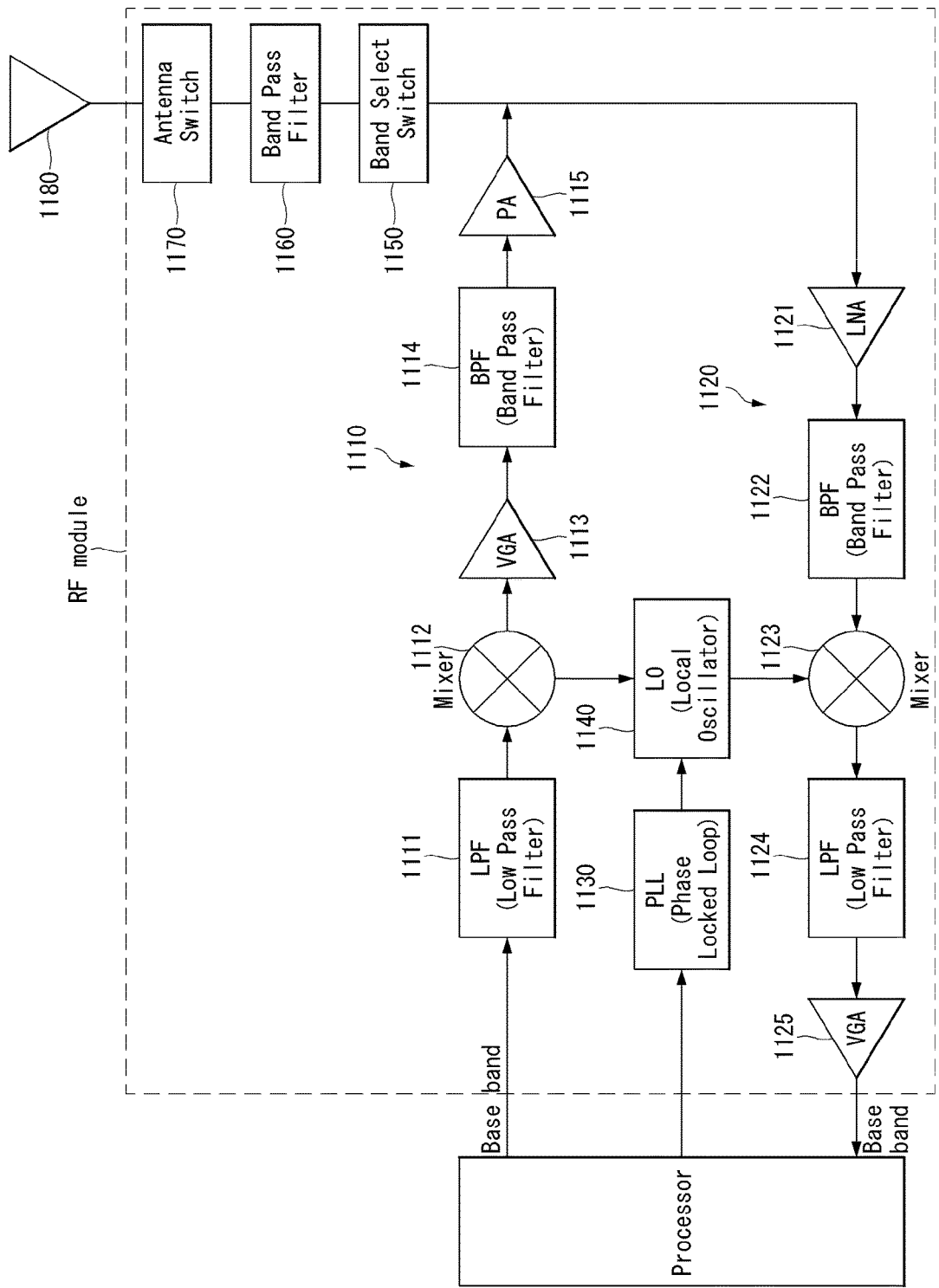
[Fig. 11]

METHOD FOR REPORTING CHANNEL STATE INFORMATION IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2018/003524, filed on Mar. 26, 2018, which claims the benefit of U.S. Provisional Application No. 62/478,517, filed on Mar. 29, 2017. The disclosures of the prior applications are incorporated by reference in their entirety.

TECHNICAL FIELD

The present disclosure relates to a wireless communication system and, more particularly, to a method of reporting, by a user equipment, channel state information and an apparatus therefor.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

The present disclosure proposes an efficient CSI measurement and reporting method for MU-MIMO in a wireless communication system.

The technical objects to attain in the present disclosure are not limited to the above-described technical objects and other technical objects which are not described herein will become apparent to those skilled in the art from the following description.

Technical Solution

According to an embodiment of the present disclosure, a method of reporting, by a user equipment (UE), channel state information (CSI) in a wireless communication system includes receiving, from a base station, CSI-reference signal (RS) resource configuration information for receiving a first CSI-RS resource, receiving the first CSI-RS resource based on the CSI resource configuration information, and reporting, to the base station, a first CSI based on the first CSI-RS resource. If the UE is configured with one N-port CSI-RS resource based on the CSI resource configuration information, some ports of the one Y-port CSI-RS resource may be configured for the channel measurement of the UE, and the remaining ports other than the some ports of the one Y-port CSI-RS resource may be configured for the interference measurement of the UE.

Furthermore, the some ports configured for the channel measurement may be ports configured for data transmission to the UE, and the remaining ports configured for the interference measurement may be ports configured for data transmission to a different UE.

Furthermore, if information related to the Y value, the some ports and/or the remaining ports is indicated, the information may be indicated through downlink control information (DCI) or radio resource control (RRC) signaling.

Furthermore, the information related to the some ports may include the number of the some ports and/or index information of the some ports.

Furthermore, the first CSI may include only a channel quality indicator (CQI) or may include the CQI, a rank indicator (RI) and a precoding matrix index/indicator (PMI).

Furthermore, the RI may be signaled to indicate the number equal to or smaller than the number of some ports as the number of ranks.

Furthermore, the CQI may be calculated by considering a power offset indicated for each Y-port by the base station.

Furthermore, the information related to the some ports may be indicated in a bitmap form.

Furthermore, the CSI reporting method may further include selecting a preset number of ports as the some ports in order of stronger transmission power intensity for each Y-port if information related to the some ports is not indicated.

Furthermore, it may be assumed that the Y-port is mapped to a data demodulation-RS (DM-RS) port in a one-to-one way.

Furthermore, the transmission of the first CSI-RS resource and the reporting of the first CSI may be performed aperiodically.

Furthermore, the CSI reporting method may further include receiving a second CSI-RS resource and reporting a second CSI to the base station based on the second CSI-RS resource, prior to the reception of the CSI-RS resource configuration information.

Furthermore, a group including the UE and the different UE may be determined based on the second CSI, and the first CSI-RS resource may be transmitted to the group.

Furthermore, the number of some ports may be set to be equal to or smaller than the number of ranks reported through an RI within the second CSI.

Furthermore, according to another embodiment of the present disclosure, a user equipment reporting channel state information (CSI) in a wireless communication system includes a radio frequency (RF) unit for transmitting or receiving a radio signal and a processor configured to control the RF unit. The processor may be configured to receive, from a base station, CSI-reference signal (RS) resource configuration information for receiving a first CSI-RS resource, receive the first CSI-RS resource based on the CSI resource configuration information, and report, to the base station, a first CSI based on the first CSI-RS resource. If the UE may be configured with one N-port CSI-RS resource based on the CSI resource configuration information, some ports of the one Y-port CSI-RS resource may be configured for the channel measurement of the UE, and remaining ports other than the some ports of the one Y-port CSI-RS resource may be configured for the interference measurement of the UE.

Advantageous Effects

According to an embodiment of the present disclosure, there is an advantage in that a base station can flexibly configure/set a port for channel measurement and a port for interference measurement port-wise within a single CSI-RS resource.

Furthermore, according to an embodiment of the present disclosure, there is an effect in that more accurate CSI can be obtained because channel measurement and interference measurement are possible at the same timing.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 illustrates the structure of a radio frame in a wireless communication system to which the present invention may be applied.

FIG. 2 is a diagram illustrating a resource grid for one downlink slot in a wireless communication system to which the present invention may be applied.

FIG. 3 illustrates the structure of a downlink subframe in a wireless communication system to which the present invention may be applied.

FIG. 4 illustrates the structure of an uplink subframe in a wireless communication system to which the present invention may be applied.

FIG. 5 illustrates a self-contained subframe structure to which the present invention may be applied.

FIG. 6 exemplifies a sub-array partition model, which is a first TXRU virtualization model option.

FIG. 7 exemplifies a full-connection model, which is a second TXRU virtualization model option.

FIG. 8 is a flowchart illustrating a CSI reporting method of a UE according to an embodiment of the present invention.

FIG. 9 is a block diagram illustrating configuration of a wireless communication device according to an embodiment of the present invention.

FIG. 10 is a diagram illustrating an example of the RF module of a wireless communication device to which a method proposed in this specification may be applied.

FIG. 11 is a diagram illustrating another example of the RF module of a wireless communication device to which a method proposed in this specification may be applied.

MODE FOR INVENTION

Some embodiments of the present disclosure are described in detail with reference to the accompanying drawings. A detailed description to be disclosed along with the accompanying drawings are intended to describe some exemplary embodiments of the present disclosure and are not intended to describe a sole embodiment of the present disclosure. The following detailed description includes more details in order to provide full understanding of the present disclosure. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station (BS) (or eNB) has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), an access point (AP), g-NodeB (gNB), New RAT (NR) or 5G-NodeB. Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help understanding of the present invention and the use of such specific terms may be modified into other forms within the scope without departing from the technical spirit of the present invention.

The following technologies may be used in various wireless communication systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. TDMA may be implemented by radio technology such as global system for mobile communications (GSM)/general packet radio service (GPRS)/enhanced data rates for GSM Evolution (EDGE). OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

Embodiments of the present invention may be based on standard documents disclosed in at least one of IEEE 802, 3GPP, and 3GPP2 which are the wireless access systems. That is, steps or parts which are not described to clearly expose the technical spirit of the present invention may be supported by the documents. Further, all terms disclosed in this document may be described by the standard documents.

In order to more clarify a description, 3GPP LTE/LTE-A is chiefly described, but the technical characteristics of the present invention are not limited thereto.

General System

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

FIG. 1(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the type 2 radio frame structure of a TDD system, an uplink-downlink configuration is a rule showing how uplink and downlink are allocated (or reserved) with respect to all of subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame. The uplink-downlink configuration may be divided into seven types. The location and/or number of downlink subframes, special subframes, and uplink subframes are different in the seven types.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all of the seven configurations, No. 0 and No. 5 subframes and DwPTSs are an interval for only downlink transmission. The UpPTSs, the subframes, and a subframe subsequent to the subframes are always an interval for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 shows a configuration (i.e., the length of a DwPTS/GP/UpPTS) of the special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |

TABLE 2-continued

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |

The structure of a radio frame is only one example. The number of subcarriers included in one radio frame, the number of slots included in a subframe, and the number of OFDM symbols included in one slot may be changed in various ways.

FIG. 2 is a diagram illustrating a resource grid for one downlink slot in a wireless communication system to which the present invention may be applied.

Referring to FIG. 2, one downlink slot includes the plurality of OFDM symbols in a time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element, and one resource block (RB) includes 12×7 resource elements. The number of RBs NDL included in a downlink slot depends on a downlink transmission bandwidth.

A structure of an uplink slot may be the same as that of a downlink slot.

FIG. 3 shows a structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH), and the like.

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

A base station determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows a structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

As more communication devices require greater communication capacity, a necessity of mobile broadband communication which is more improved than the existing radio access technology (RAT) has been raised. In addition, the massive MTC (Machine Type Communications) that provides various services anytime and anywhere by connecting a plurality of devices and objects is also one of important issues, which is considered in a next generation communication. Moreover, it has been discussed a design of a communication system in which a service and/or a UE sensitive to reliability and latency. As such, an introduction of a next generation RAT has been discussed currently, which considers enhanced mobile broadband communication, massive MTC, Ultra-Reliable and Low Latency Communication (URLLC), and the like, and such a technology is referred to as 'new RAT (NR)'.

OFDM Numerology

A New RAT system uses an OFDM transmission method or a similar transmission method thereof, and representatively has an OFDM numerology, such as Table 3.

TABLE 3

| Parameter | Value |
| --- | --- |
| Subcarrier-spacing (Δf) | 75 kHz |
| OFDM symbol length | 13.33 us |
| a cyclic prefix (CP) length | 1.04 us/0/94 us |
| System BW | 100 MHz |
| No. of available subcarriers | 1200 |
| Subframe length | 0.2 ms |
| Number of OFDM symbol per Subframe | 14 symbols |

Alternatively, a New RAT system uses an OFDM transmission method or a similar transmission method thereof, and may select and use some of a plurality of the OFDM numerologies, such as Table 3. Referring to Table 3, the New RAT system may use an OFDM numerology having 30, 60 or 120 kHz subcarrier-spacing in a multiple relation based on 15 kHz subcarrier-spacing used in the LTE system.

Table 3 illustrates a cyclic prefix, a system bandwidth (BW), the number of available subcarriers, a subframe length and the number of OFDM symbols per subframe, which may be partially changed in design. Representatively, in the case of the 60 kHz subcarrier-spacing, a system bandwidth may be set to 100 MHz. In this case, the number of available subcarriers may be more than 1500 and is smaller than 1666.

TABLE 4

| Parameter | Value | Value | Value | Value |
| --- | --- | --- | --- | --- |
| Subcarrier-spacing (Δf) | 15 kHz | 30 kHz | 60 kHz | 120 kHz |
| OFDM symbol length | 66.66 | 33.33 | 16.66 | 8.33 |
| a cyclic prefix (CP) length | 5.20 us/ 4.69us | 2.60 us/ 2.34 us | 1.30 us/ 1.17 us | 0.65 us/ 0.59 us |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

Self-Contained Subframe Structure

FIG. 5 illustrates a self-contained subframe structure to which the present invention may be applied.

In TDD system, in order to minimize data transmission delay, the self-contained subframe structure as shown in FIG. 5 has been considered in 5 Generation new RAT. In FIG. 5, a slashed region denotes the transmission region of a physical channel PDCCH for DCI transmission, and a black portion denotes a physical channel PUCCH transmission region for uplink control information (UCI) transmission. In this case, control information transmitted from an eNB to a UE through DCI may include information related to a cell configuration that needs to be aware by the UE, DL-specific information, such as DL scheduling and/or UL specific information, such as an UL grant. Furthermore, control information transmitted from the UE to the eNB through UCI may include ACK/NACK reporting of an HARQ for DL data, CSI reporting for a DL channel state and/or a scheduling request (SR).

Furthermore, in a region not having indication in FIG. 5, a physical channel PDSCH may be used for downlink data transmission, and a physical channel PUSCH may be used for uplink data transmission. In the characteristics of such a structure, a DL transmission and a UL transmission may be sequentially progressed in a subframe, a DL data may be transmitted and a UL ACK/NACK may be received in a subframe. Consequently, a time required for retransmitting data is reduced when a data transmission error occurs, and owing to this, the delay till the last data forwarding may be minimized.

As an example of the self-contained subframe structure which may be configured/setup in a system operating based on New RAT, the following at least four subframe types may be considered. Hereinafter, the durations existed in each of the subframe types are numerated in time sequence.

1) DL control duration+DL data duration+guard period (GP)+UL control duration

2) DL control duration+DL data duration

3) DL control duration+GP+UL data duration+UL control duration

4) DL control duration+GP+UL data duration

In such a self-contained subframe structure, a time gap is required for a process that an eNB and a UE switch from a transmission mode to a reception mode or a process that an eNB and a UE switch from a reception mode to a transmission mode. For this, a part of OFDM symbols on the timing switching from DL to UL may be setup as GP, and such a subframe type may be referred to as 'self-contained SF.

Analog Beamforming

In Millimeter Wave (mmW) band, a wavelength becomes short and an installation of a plurality of antenna elements is available in the same area. That is, the wavelength in 30 GHz band is 1 cm, and accordingly, an installation of total 100 antenna elements is available in 2-dimensional arrangement shape with 0.5 lambda (wavelength) intervals in 5 by 5 cm panel. Therefore, in mmW band, beamforming (BF) gain is increased by using a plurality of antenna elements, and accordingly, coverage is increased or throughput becomes higher.

In this case, each antenna element has a Transceiver Unit (TXRU) such that it is available to adjust a transmission power and a phase, and independent beamforming is available for each frequency resource. However, it has a problem that effectiveness is degraded in a cost aspect when TXRUs are installed in all of about 100 antenna elements. Accordingly, a method has been considered to map a plurality of antenna elements in a single TXRU and to adjust a direction of beam by an analog phase shifter. Such an analog beamforming technique may make only one beam direction throughout the entire band, and there is a disadvantage that frequency selective beamforming is not available.

As a middle form between a Digital BF and an analog BF, B number of hybrid BF may be considered which is smaller than Q number of antenna element. In this case, directions of beams that may be transmitted simultaneously are limited lower than B number; even it is changed according to a connection scheme between B number of TXRUs and Q number of antenna elements.

FIGS. 6 and 7 illustrate a representative connection scheme between a TXRU and an antenna element. More particularly, FIG. 6 exemplifies a sub-array partition model, which is a first TXRU virtualization model option and FIG. 7 exemplifies a full-connection model, which is a second TXRU virtualization model option. In FIGS. 6 and 7, TXRU virtualization model represents a relation between an output signal of a TXRU and an output signal of an antenna element.

As shown in FIG. 6, in the case of the virtualization model in which a TXRU is connected to a sub-array, an antenna element is connected to only a single TXRU. Different from this, in the case of the virtualization model in which a TXRU is connected to all antenna elements, an antenna element is connected to all TXRUs. In these drawings, W represents a phase vector which is multiplied by an analog phase shifter. That is, a direction of analog beamforming is determined by W. Here, mapping between CSI-RS antenna ports and TXRUs may be 1 to 1 (1:1) or 1 to many (1:N).

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is mainly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna should be detected in order to accurately receive the signal. Accordingly, each transmission antenna should have an individual reference signal.

In a mobile communication system, an RS may be basically divided into two types depending on its purpose. There are an RS having a purpose of obtaining channel state information and an RS used for data demodulation. The former has a purpose of obtaining, by a UE, to obtain channel state information in the downlink, and accordingly, a corresponding RS should be transmitted in a wideband, and a UE should be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS should be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement may be provided using such RSs. That is, the DRS is used only for data demodulation, and the CRS is used for the two purposes of channel information acquisition and data demodulation.

The reception side (i.e., UE) measures a channel state based on a CRS and feedbacks an indicator related to channel quality, such as a channel quality indicator (CQI), a precoding matrix indicator (PMI) and/or a rank indicator (RI), back to the transmission side (i.e., an eNB). The CRS is also called a cell-specific RS. On the other hand, a reference signal related to the feedback of channel state information (CSI) may be defined as a CSI-RS.

In 3GPP LTE(-A) system, it is defined that a UE reports CSI to a BS. Here, the CSI is commonly called for the information that may represent a quality of a radio channel (or also referred to as a link) established between a UE and an antenna port. For example, the CSI may correspond to a rank indicator (RI), a precoding matrix indicator (PMI), and/or a channel quality indicator (CQI), and the like. Here, RI represents rank information of a channel, and this may mean the number of streams that a UE receives through the same time-frequency resource. Since RI is determined with being dependent upon long-term fading of a channel, the RI is fed back from a UE to a BS with a period longer than CQI, generally. PMI is a value that reflects a channel space property, and represents a precoding index that a UE prefers based on a metric such as SINR. CQI is a value that represents signal strength, and means a reception SINR that is obtainable when a BS uses the PMI, generally.

In 3GPP LTE(-A) system, a BS may setup a plurality of CSI processes to a UE, and may receive CSI report for each process. Here, the CSI process may include CSI-RS for signal quality measurement/specification from a BS and CSI-interference measurement (CSI-IM) resource for interference measurement.

The DRS may be transmitted through resource elements if data demodulation on a PDSCH is required. A UE may receive information about whether a DRS is present through a higher layer, and the DRS is valid only in the case that a corresponding PDSCH has been mapped. The DRS may also be called a UE-specific RS or Demodulation RS (DMRS).

In the case that an eNB uses a single transmission antenna, reference signals for a single antenna port are arrayed.

In the case that an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, in the case that an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user MIMO antenna.

In the case that a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

In an LTE-A system, that is, an evolved and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, in the case that an eNB has four to a maximum of eight downlink transmission antennas in the LTE-A system, RSs for these antenna ports must be additionally defined and designed. Regarding the RSs for the maximum of eight transmission antenna ports, both of the aforementioned RS for channel measurement and the aforementioned RS for data demodulation should be designed.

One of important factors considered in designing an LTE-A system is backward compatibility, that is, that an LTE UE should operate properly also in the LTE-A system, which should be supported by the system. From an RS transmission aspect, in the time-frequency domain in which a CRS defined in LTE is transmitted in a full band every subframe, RSs for a maximum of eight transmission antenna ports should be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement purpose for the selection of MCS or a PMI (channel state information-RS, channel state indication-RS (CSI-RS), etc.) and an RS for the demodulation of data transmitted through eight transmission antennas (data demodulation-RS (DM-RS)).

The CSI-RS for the channel measurement purpose is characterized in that it is designed for a purpose focused on channel measurement unlike the existing CRS used for purposes of measurement, such as channel measurement and handover, and for data demodulation. Furthermore, the CSI-RS may also be used for a purpose of measurement, such as handover. The CSI-RS does not need to be transmitted every subframe unlike the CRS because it is transmitted for a purpose of obtaining information about a channel state. In order to reduce overhead of a CSI-RS, the CSI-RS is intermittently transmitted on the time axis.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement purpose of the selection of MCS or a PMI and the DM-RS for data demodulation, and thus the two RSs have been added. The CSI-RS may also be used for a purpose, such as RRM measurement, but has been designed for a main purpose for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

In order to measure a CSI-RS, a UE should be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB should notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined only for a subcarrier interval $\Delta f=15$ kHz.

CSI Measurement and Report

A UE may be configured with the following characteristics for CSI acquisition:

CSI measurement setting (also called 'measurement linked') that connect N ($\geq 1$) CSI reporting settings, M ($\geq 1$) RS settings, J ($\geq 1$) IM settings and N CSI reporting settings with M RS settings and J IM settings CSI reporting setting includes at least the followings:

time-domain operation: aperiodic or periodic/semi-persistent frequency-unit for a PMI and CQI at least reported CSI parameter (if PMI is reported, PMI type (type I or II) and codebook configuration)

RS setting includes at least the followings:

time-domain operation: aperiodic or periodic/semi-persistent

RS type including at least a CSI-RS

An RS resource set(s) of K resources

IM setting includes at least the followings:

time-domain operation: aperiodic or periodic/semi-persistent

IM type including CSI-IM

RS setting and IM setting may be merged.

CSI measurement setting includes at least the followings:

one CSI reporting setting one RS setting one IM setting

In the case of CQI, a reference transmission scheme configuration

That is, CSI measurement setting performs a function for mutually connecting specific CSI reporting setting, specific RS setting and/or specific IM setting. A UE may consider CSI reporting setting, RS setting and/or IM setting configured through one CSI measurement setting to be associated/related.

RS setting may be named resource setting, and includes a signal configuration for channel and/or interference measurement. IM setting may be removed.

A UE may be configured with NW CSI reporting setting, W1 resource setting and 1 CSI measurement setting. In this case, CSI measurement setting includes link.

Each L link may correspond to CSI reporting setting and resource setting.

At least the following configuration parameter may be signaled through RRC for at least CSI acquisition.

N, M and L—implicitly or explicitly indicated

In each CSI reporting setting, at least: a reported CSI parameter variable, if reported, CSI type (I or II), a codebook configuration including codebook subset restriction, a time-region operation, frequency granularity for CQI and PMI, measurement restriction configurations In each resource setting:

the configuration of S≥1 CSI-RS resource set(s) (each set corresponds to different selection from a 'pool' of all CSI-RS resources configured in a UE)

the configuration of Ks≥1 CSI-RS resources for each set(s) includes mapping to at least an RE, the number of ports, a time region operation In each L link of CSI measurement setting: CSI reporting setting indication, resource setting indication, a quantity to be measured (channel or interference)

One CSI reporting setting may be connected to one or more resource settings

A plurality of CSI reporting settings may be connected to the same resource setting At least the followings may be dynamically selected by L1 or L2 signaling:

One or several CSI reporting settings within CSI measurement setting

At least one CSI-RS resource set selected in at least one resource setting

At least one CSI-RS resource selected in at least one CSI-RS resource set

UE measurement based on an RS for beam management (at least CSI-RS) configured with K (=a total number of configured beams) beams and reporting the measurement result of N selected beams:

N does not need to be essentially fixed a method of configuring and/or indicating an N value A procedure based on an RS for a mobility purpose is not excluded Reporting information includes at least the followings:

A measurement quantity for an N beam(s)

Reporting content, such as a CSI, RSRP or both a method of selecting an N beam

A subset identification method information indicating an N DL transmission beam(s) (if N<K)

Detailed information, such as a CSI-RS resource ID, an antenna port index, a combination of an antenna port index and a time index, and a sequence index Hereinafter, a CSI measurement/reporting operation in a 3GPP New RAT system is first described. In relation to this contents, the 3GPP TS 38.802 standard document may be merged into this specification.

In the case of NR, DL CSI measurement having X antenna ports is supported. In the case of at least CSI acquisition, NR supports a CSI-RS and a sound reference signal (SRS).

NR supports aperiodic, semi-persistent, and periodic CSI reporting.

The periodic CSI reporting may be configured by a higher layer. The higher layer configuration may include a minimum CSI reporting period and timing offset. In the case of the semi-persistent CSI reporting, CSI reporting setting may be activated or deactivated.

Furthermore, in NR, CSI reporting having two types of spatial information feedback is supported.

1. Type I Feedback: Normal

Type I feedback is codebook-based PMI feedback having normal spatial resolution. The PMI codebook has at least two stages, that is, W=W1W2 in which a W1 codebook is configured with beam groups/vectors. The Type I feedback supports at least the following (DL) CSI reporting parameter:

Resource selection indicator (indicates reference signal resource, port, reference signal sequence and/or beam, etc.)

RI

PMI

Channel quality feedback

In the case of at least a single panel, codebook-based PMI feedback may have 2-stage, that is, W=W1W2.

In the case of at least Type I CSI feedback, a co-phase factor is applied across the entire panel, and a multi-panel scenario may be supported.

Alt1: a wideband co-phase factor across the entire panel

Alt2: a wideband and subband co-phase factor across the entire panel

2. Type II Feedback: Enhanced

Type II feedback is explicit feedback and/or codebook-based feedback having higher spatial resolution.

For Type II CSI, at least one method of the following categories 1, 2 and/or 3 is supported.

1) Category 1: Precoder Feedback Based on a Linear Combination Codebook

Dual-stage W=W1W2 codebook

W1 is configured with a set of L orthogonal beams fetched from a 2D DFT beam.

A set of L beams is selected from a basis configured with an oversampled 2D DFT beam: L∈{2, 3, 4} (L is configurable)

Beam selection is a wideband.

W2: L beams are combined in W2 with common W1.

Subband reporting of phase quantization of a beam combining coefficient

Configurable between quadrature phase shift keying (QPSK) and 8-PSK phase-related information quantization Beam amplitude scaling quantization may be configured for wideband or subband reporting.

2) Category 2: Covariance Matrix Feedback

Feedback of a channel covariance matrix is a long-term and wideband.

The quantization/compressed version of a covariance matrix is reported by a UE.

Quantization/compression is based on a set of M orthogonal basis vectors.

Reporting may include the indicators of M basis vectors along with a set of coefficients.

Another quantization/compressed version of a channel covariance matrix is not excluded.

3) Category 3: Hybrid CSI Feedback

A Type II category 1 or 2 CSI codebook may be used along with LTE-class-B-Type-like CSI feedback (e.g., based on a port selection/combination codebook).

An LTE-class-B-Type-like CSI feedback may be based on the Type I or Type II CSI codebook.

In the case of Type I and Type II, CSI feedback is supported every subband in addition to a partial band and/or wideband feedback. In the case of Type I and II, beam-related feedback may also be included. In the case of CSI reporting for a component carrier, at least three types of different frequency granularities are supported.

In the case of wideband CSI, a wideband size is determined by the RF capability of a UE that receives a DL signal. A wideband location may be configured for each network. For example, wideband CSI may be used in at least analog beam management.

In the case of subband CSI, the following Alts are present.
Alt1. A bandwidth configurable UE-specifically
Alt2. A size is determined by the configuration of a numerology or by a scheduling time unit within a UE-specific wideband. Alt2 may be applied to only a case where another numerology or scheduling time unit is multiplexed within a wideband.

For example, subband CSI is used for at least analog beam management and CSI management for each service.

In the case of subband CSI, a band size is determined by splitting a wideband or subband into multiple bands. For example, subband CSI is used for at least frequency selective scheduling and subband precoding.

In relation to related CSI-RS transmission and CSI reporting, at least the following combinations are supported:
In the case of a periodic CSI-RS,
Semi-permanent CSI reporting is activated/deactivated by a MAC CE and/or DCI.
Aperiodic CSI reporting is triggered by DCI.
In the case of a semi-persistent CSI-RS,
Periodic CSI reporting is not supported.
Semi-permanent CSI reporting is activated/deactivated by a MAC CE and/or DCI.
A semi-persistent CSI-RS is activated/deactivated by a MAC CE and/or DCI.
Aperiodic CSI reporting is triggered by DCI.
A semi-persistent CSI-RS is activated/deactivated by a MAC CE and/or DCI.
In the case of aperiodic CSI-RS,
Periodic CSI reporting is not supported.
Aperiodic CSI reporting is triggered by DCI.
Aperiodic CSI-RS is triggered by DCI and/or a MAC CE.

In measurement setting, an RS and reporting may be dynamically triggered through a link. In order to support the combinations more flexibly, NR needs to be capable of independently controlling CSI-RS indication and CSI reporting indication timing. The indication may indicate triggering, activation and deactivation depending on an RS/reporting Type. Furthermore, NR supports a mechanism for triggering an aperiodic CSI-RS and aperiodic CSI reporting simultaneously. If aperiodic CSI-RS triggering is performed by DCI with respect to an aperiodic CSI-RS timing offset X, at least X=0 is supported.

The aperiodic CSI-RS timing offset X indicates a time interval between aperiodic CSI-RS triggering and aperiodic CSI-RS transmission in relation to the number of slots. A CSI reporting timing offset Y that is fixed or configurable by a network may have a specific restriction with respect to the lower limit of Y in order to provide a sufficient CSI calculation time. An aperiodic CSI reporting timing offset Y indicates a time interval between aperiodic CSI reporting triggering and aperiodic CSI reporting in relation to the number of slots.

Under a different interference assumption, interference measurement needs to be supported in NR. For interference measurement, at least one of the following methods may be supported:
A measurement sub-set in the time and frequency domain
An interference measurement restriction in the time and frequency domain In a CSI configuration, at least two types of resources used for interference measurement may be supported based on candidates (in particular, each of the candidates independently or a given combination of the candidates), such as a zero power (ZP) CSI-RS, a non-ZP (NZP) CSI-RS and a DMRS. In this case, an interference measurement-based ZP CSI-RS is supported between three types of candidates. NR supports a ZP CSI-RS-based aperiodic interference measurement resource (IMR), a semi-persistent IMR and a periodic IMR for interference measurement for CSI feedback. In the case of the IMR based on a ZP CSI-RS, three types of different time domain operations are configured in a resource setting(s).

A UE may be configured with NW CSI reporting settings, W1 resource settings and one CSI measurement setting. In this case, the CSI measurement setting includes L≥1 link, and the L value may be different depending on a UE capability. A CSI acquisition framework (including CSI measurement, resource and CSI reporting setting) supports a configuration that provides similar to Re1.14 eFD-MIMO hybrid CSI mechanisms 1 and 2. For example,
Long-term CSI for a plurality of antenna ports or a plurality of NZP CSI-RS resources
Short-term CSI for a plurality of antenna ports having one or more NZP CSI-RS resources
The number of ports of long-term CSI and the number of ports of short-term CSI may be the same or different.

At least the following configuration parameters may be signaled through RRC for at least CSI acquisition:
N, M and L are indicated implicitly or explicitly.
In each CSI reporting setting, at least: a reported CSI parameter, and a CSI Type (I or II), a codebook configuration including a codebook sub-set restriction, a time-domain operation, a frequency granularity unit for a CQI and PMI, and a measurement restriction configuration in the case of reported.
A CSI parameter CRI is supported. A CRI function includes the selection and reporting of N indices among K NZP CSI-RS resources. If N_max>1 is supported, the value of N is included in an associated CSI reporting setting. In this case, a maximum value of N∈{1, 2, . . . , K} may be a UE capability.
A CSI reporting band is defined as a set of (contiguous or non-contiguous) subbands related to a CSI reporting setting. Three types of frequency granularities, such as wideband reporting, partial reporting and subband reporting, are supported. At least a combination of specific CSI parameters (e.g., CRI, RI, PMI, and CQI) may be configured so that they are not reported within a CSI reporting setting.
In each resource setting:
A configuration of S≥1 CSI-RS resource set(s)
Each set corresponds to a different selection from a "pool" of all CSI-RS resources configured in a UE.
A configuration of K_s≥1 CSI-RS resources for each set "s", including at least mapping to REs, the number of ports, and a time-domain operation.
A time domain behavior: an aperiodic, periodic or semi-persistent
In each semi-persistent or periodic resource setting, a period is included in configuration information.

In each L link of a CSI measurement setting: CSI reporting setting indication, resource setting indication, a quantity to be measured (channel or interference)

One CSI reporting setting may be connected to one or more resource settings.

Several CSI reporting settings may be connected.

Each resource setting includes an RS Type encompassing at least a CSI-RS.

If applicable, at least the followings are dynamically selected depending on L1 or L2 signaling.

One or several CSI reporting settings within a CSI measurement setting

One or more CSI-RS resource sets selected from one or more resource settings

One or more CSI-RS resources selected from one or more CSI-RS resource sets

In NR AH #3, the support of an NZP CSI-RS-based IMR was agreed. One of the two alternatives of the NZP CSI-RS-based IMR needs to be selected:

Alt.1: a single CSI-RS resource for both channel and interference measurements

Alt.2: a CSI-RS resource separately configured for channel and interference measurements A major use case of the NZP CSI-RS-based IMR is for more accurate MU CQI estimation. The ZP CSI-RS-based IMR appears to be sufficient for interference measurement in another use case, for example, from another transmission reception point (TRP)/beam. In a conventional technology, a UE assumes that each port of a set corresponds to an interfering layer. Accordingly, the beam of an interfering UE needs to be determined prior to interference measurement (IM) NZP CSI-RS transmission. Each of MU UEs considers channels desired by other UEs to be interference, and thus a desired beam in addition to an interfering beam needs to be determined prior to channel measurement NZP CSI-RS transmission. If not, a reported MU-CQI is not accurate because some of MU UEs may report an MU-CQI assuming an old MU interfering beam. Accordingly, a UE needs to assume that each of channel measurement NZP CSI-RS ports corresponds to a desired layer. This means that an identity precoder is assumed when a CQI is calculated.

Accordingly, this specification proposes that a UE assumes that each channel measurement NZP CSI-RS port corresponds to a desired layer. This means that an identity precoder is assumed upon MU-CQI calculation.

Next, an alternative method capable of supporting MU CQI enhancement more efficiently is discussed.

In the case of the Alt. 1, one NZP CSI-RS may be shared with an MU UE. A port group indicating a channel and interference may be substituted/indicated in a UE-specific manner. For example, four CSI-RS ports may be configured in a UE #0 and UE #1 in common. A port {#0, #1} is beamformed by the UE #0 as a desired beam, and a port {#2, #3} is beamformed by the UE #1 as a desired beam. The UE #0 may receive indication so that the UE assumes the port {#0, #1} as a channel and the port {#2, #3} as interference and calculates CSI. The UE #1 may receive indication so that the UE assumes the port {#2, #3} as a channel and the port {#0, #1} as interference and calculates CSI. A port set for a channel and interference may be explicitly indicated or may be implicitly determined based on a previously reported RI.

A co-scheduled UE group and the number of ports indicating a channel and interference may be dynamically changed. Accordingly, the Alt.1 is simpler and more flexible than the Alt.2, and is more suitable for an MU use case and efficient. If the Alt.2 is supported, a standardization task not essential for a variation and the NR phase I may be too much open. It is to be noted that a ZP CSI-RS-based IMR can cover most of use cases.

Accordingly, this specification proposes the support (i.e., Alt.1) of a single CSI-RS resource for a channel and interference measurement with respect to a NZP CSI-RS-based IMR. According to the Alt.1, there are advantages in that a UE can incorporate an interference situation more precisely in a relation with other UEs when deriving an MU-CQI and more accurate interference measurement is made possible.

Hereinafter, detailed embodiments of the Alt.1 are described. Furthermore, a CSI reporting method for accurately determining a transmission MCS in an MU-MIMO transmission method is proposed below.

1. Hybrid CSI Reporting Procedure

Hereinafter, there is proposed a method for reporting an MU-MIMO CSI through a hybrid CSI reporting method configured with a multi-stage.

If codebook-based Type I feedback is used for CSI reporting, there is a limit in accurately representing a channel due to the size restriction of a codebook. Accordingly, as described above, if a UE group to be co-scheduled for MU-MIMO is determined based on reported Type I CSI feedback and a base station transmits a PDSCH as an MCS determined based on a corrected CQI, it is difficult to match a target initial packet error rate of 10%, and transmission efficiency is low because too many retransmissions are necessary. In order to solve such problems, accurate information for a channel may be reported to a base station through explicit CSI feedback (Type II CSI feedback) methods, but this has a problem in that feedback overhead excessively increases.

Accordingly, this specification proposes a method in which in Stage 1, a UE reports codebook-based CSI, and in Stage 2, a co-scheduling UE is determined based on the codebook-based CSI and the UE reports an accurate CQI into which cross-layer interference between corresponding UEs has been incorporated. A basic structure of such a proposed method may be represented like the following proposal 1:

Proposal 1)

Stage 1: if a base station transmits a Class A X-port NZP CSI-RS, a UE performs corresponding RI+PMI+CQI reporting or if a base station transmits a Class B (K>1) CSI-RS, a UE performs corresponding CRI+RI+PMI+CQI reporting.

Stage 2: a base station determines an MU-MIMO (pairing) group configured with N UEs based on CSI reporting of Stage 1, performs a ZP or minimum mean square error (MMSE) beamforming, configures a precoding matrix of a transmission Y-port, and transmits a corresponding precoded aperiodic Y-port CSI-RS. A UE performs CSI calculation and reporting, assuming that a signal (i.e., a signal for channel measurement) desired by the UE is transmitted through RI ports assigned thereto and an interference signal (i.e., a signal for interference measurement) is transmitted in the remaining (Y-RI) ports.

The CSI-RS transmitted in the Stage 1 process is cell-specifically transmitted. UEs that will receive DL data from a cell measure corresponding CSI-RSs and report CSI. In this case, the CSI-RS may be a non-precoded CSI-RS, such as a Class A CSI-RS incorporated into LTE Rel.13, or a precoded CSI-RS group, such as a Class B CSI-RS. The UE reports an RI, PMI, and CQI for the Class A CSI-RS, and reports a CSI-RS resource indicator (CRI), RI, PMI, and CQI for the Class B CSI-RS. The CSI-RS may be transmitted periodically, aperiodically or semi-persistently. Furthermore, CSI reporting for such a CSI-RS may be transmitted periodically, aperiodically or semi-persistently. For example, a base station may trigger aperiodic CSI reporting for M UEs while transmitting a CSI-RS aperiodically.

For the CSI-RS transmission of the Stage 2 process, first, a base station may determine an MU-MIMO pairing group configured with N UEs based on approximate channel information obtained based on the CSI reporting of M UEs in Stage 1. In this case, the base station may determine a UE group capable of maximizing transmission throughput or maximizing scheduling metric by considering fairness. In such a UE group determination process, a base station derives a channel matrix quantized by a CSI (RI, PMI, CQI) reported in Stage 1, and may determine a precoding matrix to be used for MU-MIMO transmission by performing zero-forcing (ZF) or MMSE beamforming based on the channel matrix.

The base station may transmit a precoded aperiodic Y-port CSI-RS to which an MU-MIMO precoding matrix determined as described above has been applied. In this case, Y is a total number of layers of MU-MIMO, and is the number of layers assigned to a co-scheduled n-th UE, the sum of RI(n)s (n=1, . . . N). The number (or the number of ports) RI of layers assigned to each UE may be set to be equal to or smaller than a rank reported in Stage 1.

In the proposed method, a base station may dynamically notify N selected UEs of the transmission of an aperiodic CSI-RS through DCI, and may trigger corresponding CSI measurement and reporting. A base station may notify a UE of the number of aperiodic CSI-RS ports Y through such triggering DCI. In this case, the base station may also notify the UE that which one of the Y ports has been transmitted/assigned to the UE. A detailed method for enabling a base station to notify a UE of the number of CSI-RS (resource) ports may be proposed as follows:

A1: a base station may notify/indicate the port number Y of CSI-RSs (resources) that need to be measured by a UE through a specific field within DCI that triggers CSI measurement.

A1.1: a base station may notify/indicate, through triggering DCI, how smaller a port number is than a maximum number of ports in CSI-RS resources preconfigured through RRC signaling.

A2: a base station may notify a CSI-RS port number Y for each CSI-RS resource in advance through RRC signaling, and may notify a UE whether a CSI-RS is transmitted through which resource through triggering DCI. The UE can be aware of a CSI-RS port number Y through a resource assigned/designated thereto.

Furthermore, a detailed method for notifying a corresponding UE that which one of Y ports assigned to the UE has been transmitted may be proposed as follows:

B1: a base station may notify/indicate the number RI of a port in which data will be transmitted and the start/minimum port index of indices of ports assigned to a UE through a specific field within DCI that triggers CSI measurement with respect to the UE.

B2: a port in which data will be transmitted may be designated for a UE through a specific field within DCI that triggers CSI measurement. For example, a base station may notify/indicate that which port is a port through which a signal desired by a corresponding UE will be transmitted using a field configured with a Y-bit.

B3: a UE does not receive indication separately through triggering DCI from a base station, and may autonomously determine that ports most strongly received by an RI number reported in Stage 1 are ports assigned for the transmission of a signal desired by the corresponding UE.

B4: a base station may designate only an RI for CSI reporting through RRC signaling or MAC signaling and/or triggering DCI, and may notify/indicate the RI for a UE. Alternatively, the base station may designate only a maximum allowed rank and notify/indicate the maximum allowed rank with respect to a UE.

A UE may measure/calculate and report CSI, assuming that a desired signal is transmitted in RI ports assigned thereto among precoded aperiodic Y-port CSI-RSs and an interference signal is transmitted in the remaining (Y-RI)-ports. In this specification, unless described otherwise, the UE assumes that a DM-RS port upon PDSCH transmission is mapped to a precoded CSI-RS port in a one-to-one manner. This is the same as that a precoding matrix additionally applied to a DM-RS compared to a precoded CSI-RS is limited to only an identity matrix. From a system viewpoint, a precoded aperiodic Y-port CSI-RS is transmitted to N UEs to be scheduled for co-scheduling group-specifically (in each group). An n-th UE may measure/calculate and report CSI, assuming that a desired signal is transmitted in RI(n) ports assigned thereto and an interference signal is transmitted in the remaining (Y-RI(n)) ports.

A UE may derive a CQI from the received SINR of a desired layer that has passed through an MMSE receiver in order to reduce cross-layer interference in Y cross-layers transmitted by a base station in such a CSI calculation process. Alternatively, the UE may calculate the CQI by incorporating an advanced receiver capability, such as its own interference cancellation (IC). For example, an advanced receiver UE having a 1 layer interference cancellation capability may calculate a CQI, assuming that IC has been performed on the most dominant interfering port of CSI-RS ports.

Additionally, a base station may designate a power offset for each port (i.e., layer) with respect to a UE. In this case, the UE may calculate a CQI by considering that transmission power for each port upon PDSCH transmission will change by an offset compared to transmission power for each port of an RS.

In the present disclosure, a detailed method for reporting CSI for a precoded CSI-RS may be proposed as follows:

C1: a UE may report only a CQI (as CSI). This is useful if indication, regarding that which one of Y ports corresponds to a port transmitted/designated/assigned to a corresponding UE, has been received from a base station.

C2: a UE may report a CQI, RI and/or PMI (as CSI).

C2.1: an RI reported in the proposed method may be set to be equal to or smaller than a rank assigned to a UE. The present embodiment has an advantage in that a rank may change depending on a channel change. In this case, a PMI suitable for a reduced rank may also be reported.

C2.2: a UE may report an RI and a PMI (as CSI) in order to notify a base station that how many port and/or which port of Y ports have been selected. The present embodiment is useful if a base station has not explicitly indicated/designated that which one of Y ports is a port transmitted to a corresponding UE.

C2.3: a UE may consider a penalty for each rank if it selects an RI (as CSI) within a maximum allowed rank and reports CSI. For example, a UE may calculate throughput that may be achieved for each transmission rank, and may select a rank through which a weighted throughput can be achieved to the max by multiplying a weight assigned to each rank.

C3: a UE may report a PMI along with a CQI (as CSI). The present embodiment is useful if an RI is previously designated/indicated by a base station. In this case, a UE may select the best RI ports of Y ports, and may report the selected ports to the base station in the form of a PMI.

A hybrid CSI reporting method of the present invention may be implemented using various methods. In order to notify the dependency/association of CSI between stages, the same CSI procedure may be assigned to Stage 1 CSI and Stage 2 CSI, but an additional indicator for distinguishing between the stages may be configured/defined. Alternatively, different CSI procedures may be assigned to Stage 1 CSI and Stage 2 CSI, and dependency/association between two CSI procedures may be designated/indicated. In contrast, the dependency/association between Stage 1 CSI and Stage 2 CSI may be transparent to a UE. Furthermore, as in the case of a TDD system, a base station may obtain Stage 1 CSI based on an SRS, transmitted by a UE, using channel reciprocity. In this case, the UE may be configured with only the CSI reporting method of Stage 2.

The following alternatives illustrate representative embodiments regarding a CSI reporting method of a UE proposed in this specification.

D1: in Stage 1, a UE may measure a periodic CSI-RS and report CSI to a base station periodically or aperiodically. Furthermore, in Stage 2, the UE may measure CSI through an aperiodic CSI-RS and report the CSI to the base station aperiodically.

D2: in Stage 1, a UE may measure an aperiodic CSI-RS and report CSI to a base station aperiodically. Furthermore, in Stage 2, the UE may measure an aperiodic CSI-RS and report CSI aperiodically. In this case, CSI triggering DCI transmitted to the UE may notify that CSI of which stage is triggered.

D3: Stage 1 CSI and Stage 2 CSI may be simultaneously triggered through single DCI. In this case, the corresponding DCI, Stage 1 CSI and/or Stage 2 CSI may be performed as associated consecutive operations. A CSI-RS transmission and CSI reporting operation within each stage may also be performed as associated consecutive operations. For example, if a subframe (or slot) in which corresponding DCI is transmitted is n, CSI-RS transmission in Stage 1 may be performed in (n+k1), and CSI reporting in Stage 1 may be performed in (n+k2). And/or Stage 2 CSI-RS transmission may be performed in (n+k3), and Stage 2 CSI reporting may be performed in (n+k4). In this case, k1, k2, k3, and k4 may be pre-set through RRC signaling or may be indicated through DCI.

D4: a base station may configure only CSI-RS and CSI reporting of Stage 2 in a UE, and CSI of Stage 1 may be obtained transparently to a UE.

A CSI reporting method using a port-wise precoded CSI-RS is described below. The CSI reporting method may be applied to the following embodiment identically/likewise, and a redundant description thereof is omitted.

In the case of the D4 embodiment, the stages may not be separately classified in the proposed embodiment and described as follows:

A base station transmits an MU-MIMO pairing group configured with N UEs based on previous information, configures a transmission Y-port precoding matrix by performing ZP or MMSE beamforming, and transmits a Y-port (aperiodic/periodic) precoded CSI-RS.

A UE performs CSI calculation/measurement and reporting, assuming that a desired signal (i.e., a signal for channel measurement) is transmitted in RI ports assigned thereto and an interference signal (i.e., a signal for interference measurement) is transmitted in the remaining (Y-RI) ports.

In the proposal, the base station may use channel reciprocity and previous Type I or II CSI feedback in order to collect previous information for determining an MU-MIMO pairing group.

As detailed method for notifying, by a base station, a UE of the number of CSI-RS ports, the A1, A2 method or a combined method of them may be applied. And/or as a detailed method for notifying a UE that which ports of Y ports are ports transmitted to the UE, the B1, B2, B3 method or a combined method of them may be applied. And/or as a detailed method for reporting, by a UE, CSI, the C1, C2, C3 method or a combined method of them may be applied.

The proposed CSI feedback method may be considered as a space multiplexing MIMO feedback method of a closed-loop method. According to this feedback method, there is an advantage in that a base station can flexibly configure/set a port for channel measurement and a port for interference measurement port-wise within a single CSI-RS resource. Furthermore, according to this feedback method, there is an effect in that more accurate CSI can be obtained because channel measurement and interference measurement are performed at the same timing.

FIG. 8 is a flowchart illustrating a CSI reporting method of a UE according to an embodiment of the present disclosure. The embodiments may be applied identically/likewise in relation this flowchart, and a redundant description thereof is omitted.

First, a UE may receive CSI-RS resource configuration information for the reception of a first CSI-RS resource from a base station (S810).

Next, the UE may receive the first CSI-RS resource based on the CSI resource configuration information (S820).

Next, the UE may report, to the base station, first CSI generated based on the first CSI-RS resource (S830).

The transmission of the first CSI-RS resource and the first CSI reporting may be performed aperiodically.

If the UE is configured with one N-port CSI-RS resource based on the CSI resource configuration information, the UE may configure some ports of one Y-port CSI-RS resource for the channel measurement of the UE and the remaining ports of the one Y-port CSI-RS resource other than the some ports for the interference measurement of the UE. The some ports configured for the channel measurement are ports configured for data transmission to the UE. The remaining ports configured for the interference measurement correspond to ports configured for data transmission to other UEs. It may be assumed that the Y-port is mapped to a DM-RS port in a one-to-one way.

If information related to the Y value, the some ports and/or the remaining ports are indicated (explicit/implicitly) by the base station, the information may be indicated through DCI or RRC signaling. In this case, the information related to the some ports may include information on the number of some ports and/or the indices of the some ports. In this case, first CSI reported by the UE may include only a CQI, or may include a CQI, an RI and/or a PMI. In this case, the RI may be signaled to indicate a number equal to or smaller than the number of the some ports as the number of ranks. Furthermore, the CQI may be calculated by considering a power offset indicated for each Y-port by the base station. Alternatively, the information related to the some ports may be indicated in a bitmap form.

If the information related to the some ports is not indicated, the UE may select ports, corresponding to a preset number, as the some ports in order of stronger transmission power intensity for each Y-port.

Although not shown in this flowchart, prior to the reception of the CSI-RS resource configuration information, the UE may receive a second CSI-RS resource, and may report second CSI to the base station based on the second CSI-RS resource. In this case, a group including the UE and another UE may be determined based on the second CSI. A first CSI-RS resource may be transmitted to the determined group. In this case, the number of some ports may be configured to be equal to or smaller than the number of ranks reported through an RI within the second CSI.

General Apparatus to which the Present Disclosure May be Applied

FIG. 9 is a block diagram of a wireless communication device according to an embodiment of the present invention.

Referring to FIG. 9, the wireless communication system includes a base station 910 and a plurality of terminals (or UEs) 920 located within the region of coverage of the BS 910.

The BS 910 includes a processor 911, a memory 912, and a radio frequency (RF) unit 913. The processor 911 implements functions, processes and/or methods proposed in above-describes. Layers of radio interface protocols may be implemented by the processor 911. The memory 912 may be connected to the processor 911 and stores various types of information for driving the processor 911. The RF unit 913 may be connected to the processor 911 and transmits and/or receives a radio signal.

The UE 920 includes a processor 921, a memory 922 and an RF unit 923. The processor 921 implements the proposed functions, processes and/or methods proposed in above-described embodiments. Layers of radio interface protocols may be implemented by the processor 921. The memory 922 may be connected to the processor 921 and stores various types of information for driving the processor 921. The RF unit 923 may be connected to the processor 921 and transmits and/or receives a radio signal.

The memory 912, 922 may be located inside or outside the processor 911, 921 and may be connected to the processor 911, 921 by various known means. Furthermore, the base station 910 and/or the UE 920 may have a single antenna or multiple antennas.

FIG. 10 is a diagram illustrating an example of the RF module of a wireless communication device to which a method proposed in this specification may be applied.

Specifically, FIG. 10 shows an example of an RF module that may be implemented in a frequency division duplex (FDD) system.

First, in a transmission path, the above-described processor processes data to be transmitted and provides an analog output signal to a transmitter 1010.

In the transmitter 1010, the analog output signal is filtered by a low pass filter (LPF) 1011 in order to remove images caused by digital-to-analog conversion (ADC). The signal is up-converted from a baseband to an RF by a mixer 1012 and is amplified by a variable gain amplifier (VGA) 1013. The amplified signal is filtered by a filter 1014, additionally amplified by a power amplifier (PA) 1015, routed by a duplexer(s) 1050/antenna switch(es) 1060, and transmitted through an antenna 1070.

Furthermore, in a reception path, the antenna 1070 receives signals from the outside and provides the received signals. The signals are routed by the antenna switch(es) 1060/duplexers 1050 and provided to a receiver 1020.

In the receiver 1020, the received signals are amplified by a low noise amplifier (LNA) 1023, filtered by a band pass filter 1024, and down-converted from the RF to the baseband by a mixer 1025.

The down-converted signal is filtered by a low pass filter (LPF) 1026 and amplified by a VGA 1027, thereby obtaining the analog input signal. The analog input signal is provided to the processor described in FIGS. 13 and 14.

Furthermore, a local oscillator (LO) 1040 generates transmission and reception LO signals and provides them to the mixer 1012 and the mixer 1025, respectively.

Furthermore, a phase locked loop (PLL) 1030 receives control information from the processor in order to generate transmission and reception LO signals in proper frequencies, and provides control signals to the local oscillator 1040.

Furthermore, the circuits shown in FIG. 10 may be arrayed differently from the configuration shown in FIG. 10.

FIG. 11 is a diagram illustrating another example of the RF module of a wireless communication device to which a method proposed in this specification may be applied.

Specifically, FIG. 11 shows an example of an RF module that may be implemented in a time division duplex (TDD) system.

The transmitter 1110 and receiver 1120 of the RF module in the TDD system have the same structure as the transmitter and receiver of the RF module in the FDD system.

Hereinafter, only a different structure between the RF module of the TDD system and the RF module of the FDD system is described. Reference is made to the description of FIG. 10 for the same structure.

A signal amplified by the power amplifier (PA) 1115 of the transmitter is routed through a band select switch 1150, a band pass filter (BPF) 1160 and an antenna switch(es) 1170 and is transmitted through an antenna 1180.

Furthermore, in a reception path, the antenna 1180 receives signals from the outside and provides the received signals. The signals are routed through the antenna switch (es) 1170, the band pass filter 1160 and the band select switch 1150 and are provided to the receiver 1120.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Meanwhile, the expression of CA and/or B' used in this specification may be construed as meaning at least one of A and B.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of implementations by firmware or software, an embodiment of the present invention may be implemented in the form of a module, procedure or function for performing the aforementioned functions or operations. Software code may be stored in the memory and driven by the processor. The memory may be placed inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The present invention applied to a 3GPP LTE/LTE-A/NR system is primarily described as an example, but may be applied to various wireless communication systems in addition to the 3GPP LTE/LTE-A/NR system.

The invention claimed is:

1. A method of reporting, by a user equipment (UE), channel state information (CSI) in a wireless communication system, the method comprising:
   receiving, from a base station, CSI-reference signal (RS) resource configuration information;
   receiving a first CSI-RS resource based on the CSI-RS resource configuration information; and
   reporting, to the base station, a first CSI based on the first CSI-RS resource,
   wherein a single Y-port CSI-RS resource is configured based on the CSI-RS resource configuration information, some ports of the single Y-port CSI-RS resource are configured for channel measurement of the UE, and remaining ports other than the some ports of the single Y-port CSI-RS resource are configured for interference measurement of the UE, and
   wherein based on information related to the some ports being not indicated, a preset number of ports are selected as the some ports in order of stronger transmission power intensity for each port of the single Y-port CSI-RS resource.

2. The method of claim 1,
   wherein the some ports configured for the channel measurement are ports configured for data transmission to the UE, and
   wherein the remaining ports configured for the interference measurement are ports configured for data transmission to a different UE.

3. The method of claim 2,
   wherein the information related to the some ports is indicated through downlink control information (DCI) or radio resource control (RRC) signaling.

4. The method of claim 2,
   wherein the Y-port is assumed to be mapped to a data demodulation-RS (DM-RS) port in a one-to-one way.

5. The method of claim 2,
   wherein a transmission of the first CSI-RS resource and the reporting of the first CSI are performed aperiodically.

6. The method of claim 2, further comprising:
   receiving a second CSI-RS resource and reporting a second CSI to the base station based on the second CSI-RS resource, prior to the reception of the CSI-RS resource configuration information.

7. The method of claim 6,
   wherein a group including the UE and the different UE is determined based on the second CSI, and
   wherein the first CSI-RS resource is transmitted to the group.

8. The method of claim 7,
   wherein the number of the some ports is set to be equal to or smaller than a number of ranks reported through an RI within the second CSI.

9. The method of claim 1,
   wherein the information related to the some ports comprises at least one of (i) the number of the some ports or cii) index information of the some ports.

10. The method of claim 9,
    wherein the first CSI comprises only a channel quality indicator (CQI) or comprises the CQI, a rank indicator (RI) and a precoding matrix index/indicator (PMI).

11. The method of claim 10,
    wherein the RI is signaled to indicate a number equal to or smaller than the number of the some ports as a number of ranks.

12. The method of claim 11,
    wherein the CQI is calculated by considering a power offset indicated for each port of Y-port by the base station.

13. The method of claim 1,
    wherein the information related to the some ports is indicated in a bitmap form.

14. A user equipment configured to report channel state information (CSI) in a wireless communication system, the user equipment comprising:
    a radio frequency (RF) unit;
    at least one processor; and
    at least one computer memory operably connected to the at least one processor and storing instructions that, based on being executed by the at least one processor, perform operations comprising:
    receiving, from a base station, CSI-reference signal (RS) resource configuration information;
    receiving a first CSI-RS resource based on the CSI-RS resource configuration information; and
    reporting, to the base station, a first CSI based on the first CSI-RS resource,
    wherein a single Y-port CSI-RS resource is configured based on the CSI-RS resource configuration information, some ports of the single Y-port CSI-RS resource are configured for channel measurement of the UE, and remaining ports other than the some ports of the single Y-port CSI-RS resource are configured for interference measurement of the UE, and
    wherein based on information related to the some ports being not indicated, a preset number of ports are selected as the some ports in order of stronger transmission power intensity for each port of the single Y-port CSI-RS resource.

15. At least one computer-readable storage medium storing instructions that, based on being executed by at least one processor, control a user equipment to perform operations for reporting channel state information (CSI) in a wireless communication system, the operations comprising:
- receiving, from a base station, C SI-reference signal (RS) resource configuration information;
- receiving a first CSI-RS resource based on the CSI-RS resource configuration information; and
- reporting, to the base station, a first CSI based on the first CSI-RS resource,
- wherein a single Y-port CSI-RS resource is configured based on the CSI-RS resource configuration information, some ports of the single Y-port CSI-RS resource are configured for channel measurement of the UE, and remaining ports other than the some ports of the single Y-port CSI-RS resource are configured for interference measurement of the UE, and
- wherein based on information related to the some ports being not indicated, a preset number of ports are selected as the some ports in order of stronger transmission power intensity for each port of the single Y-port CSI-RS resource.

* * * * *